(12) United States Patent
Chao et al.

(10) Patent No.: US 7,939,974 B2
(45) Date of Patent: May 10, 2011

(54) MOVABLE MAGNET TYPE LINEAR MOTOR WITH HEAT-DISSIPATING ASSEMBLY

(75) Inventors: Chih-Hsien Chao, Taichung (TW); Fu-Yuan Cheng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 32 days.

(21) Appl. No.: 12/462,321

(22) Filed: Jul. 31, 2009

(65) Prior Publication Data

US 2011/0025138 A1    Feb. 3, 2011

(51) Int. Cl.
H02K 41/03    (2006.01)
H02K 1/20    (2006.01)

(52) U.S. Cl. ............... 310/12.29; 310/16; 310/64

(58) Field of Classification Search ........... 310/12.29, 310/52, 54, 58, 64
See application file for complete search history.

(56) References Cited

U.S. PATENT DOCUMENTS

| | | | | |
|---|---|---|---|---|
| 5,783,877 A * | 7/1998 | Chitayat | .................... | 310/12.33 |
| 6,323,567 B1 * | 11/2001 | Hazelton et al. | ........... | 310/12.29 |
| 7,385,317 B2 * | 6/2008 | Sugita et al. | ................ | 310/12.15 |
| 7,732,951 B2 * | 6/2010 | Mukaide | .................... | 310/12.29 |
| 2009/0195089 A1 * | 8/2009 | Huang et al. | ................ | 310/12.29 |

FOREIGN PATENT DOCUMENTS

JP    11-206099 A    *    7/1999

OTHER PUBLICATIONS

Ishiyama et al. JP 11-206099 Jul. 1999 Machine Translation from JPO IPDL.*

* cited by examiner

*Primary Examiner* — Burton Mullins
(74) *Attorney, Agent, or Firm* — Charles E. Baxley

(57) ABSTRACT

A movable magnet type linear motor with a mover heat-dissipating assembly includes a mover having a housing receiving therein a coil seat for holding a coil, openings being formed at two opposite ends of the housing, end covers being attached to the openings and having central holes so as to allow an inner stator to pass through the holes, wherein a plurality of heat dissipating channels are provided between the coil seat and the housing while the end covers have plural heat dissipating holes corresponding to the heat dissipating channels so that external cool air is allowed to enter the housing through the heat dissipating holes and the heat dissipating channels, thereby cooling the mover.

2 Claims, 6 Drawing Sheets

MOVABLE MAGNET TYPE LINEAR MOTOR WITH HEAT-DISSIPATING ASSEMBLY

BACKGROUND OF THE INVENTION

1. Technical Field

The present invention relates to movable magnet type linear motors, and more particularly, to a movable magnet type movable magnet type linear motor having a mover equipped with a heat-dissipating assembly.

2. Description of Related Art

FIGS. 1 and 2 illustrate a known movable magnet type linear motor, which comprises a stationary inner stator 1 that is structurally a hollow tube filled with a plurality of permanent magnets, a mover 2 that is constructed form a housing 3 accommodating therein a mover coil 4, wherein two end covers 6 are provided to seal two openings 5 at opposite ends of the housing 3 and each said end cover 6 is centrally formed with a hole 7 so that the stationary inner stator 1 is allowed to axially pass through and get slidably received in the mover 2. When a current flows through the mover coil 4, the mover coil 4 produces a magnetic field to interact with the permanent magnets inside the stationary inner stator 1 thereby driving the mover 2 to axially shift along the stationary inner stator 1.

The known movable magnet type linear motor has its defects.

In long time operation, the mover 2 performs acceleration and stops frequently. Considerable heat is thus generated when current passes through the coil 4. Since there is a substantial gap between the foil 4 and the housing 3, heat of the coil 4 cannot be directly conducted to the housing for heat dissipation. Moreover, end covers sealing the whole housing 3 to protect the coil 4 and other inner components from dust, water and oil, cause disfavor to aeration and heat dissipation. Consequently, heat generated by the coil 4 can only be transmitted to the housing 3 by natural gas thermal conductivity and then get cooled by ambient air, which is a slow and ineffective heat dissipating way. For preventing overheat of the coil 4, current flowing through the coil 4 has to be limited, thus compromising the capacity of the movable magnet type linear motor.

SUMMARY OF THE INVENTION

In view of the defects of the prior art, one objective of the present invention is to provide a movable magnet type linear motor with a mover heat-dissipating assembly, wherein the heat-dissipating assembly provides highly effective heat dissipation as compared with the prior art.

Another objective of the present invention is to provide a movable magnet type linear motor with a mover heat-dissipating assembly, wherein the heat-dissipating assembly possesses excellent sealed structure so as to protect the movable magnet type linear motor against ambient dust, water and oil.

To achieve these and other objectives, the movable magnet type linear motor with the mover heat-dissipating assembly comprises a mover having a housing receiving therein a coil seat for holding a coil, openings being formed at two opposite ends of the housing, end covers being attached to the openings and having central holes so as to allow an inner stator to pass through the holes, wherein a plurality of heat dissipating channels are provided between the coil seat and the housing while the end covers have plural heat dissipating holes corresponding to the heat dissipating channels.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawing, wherein.

DETAILED DESCRIPTION OF THE PREFERRED EMBODIMENT

While a preferred embodiment provided hereinafter for illustrating the concept of the present invention as described above, it is to be understood that the components of the embodiment shown in the accompanying drawings are depicted for the sake of easy explanation and need not to be made in scale.

Figure 1:
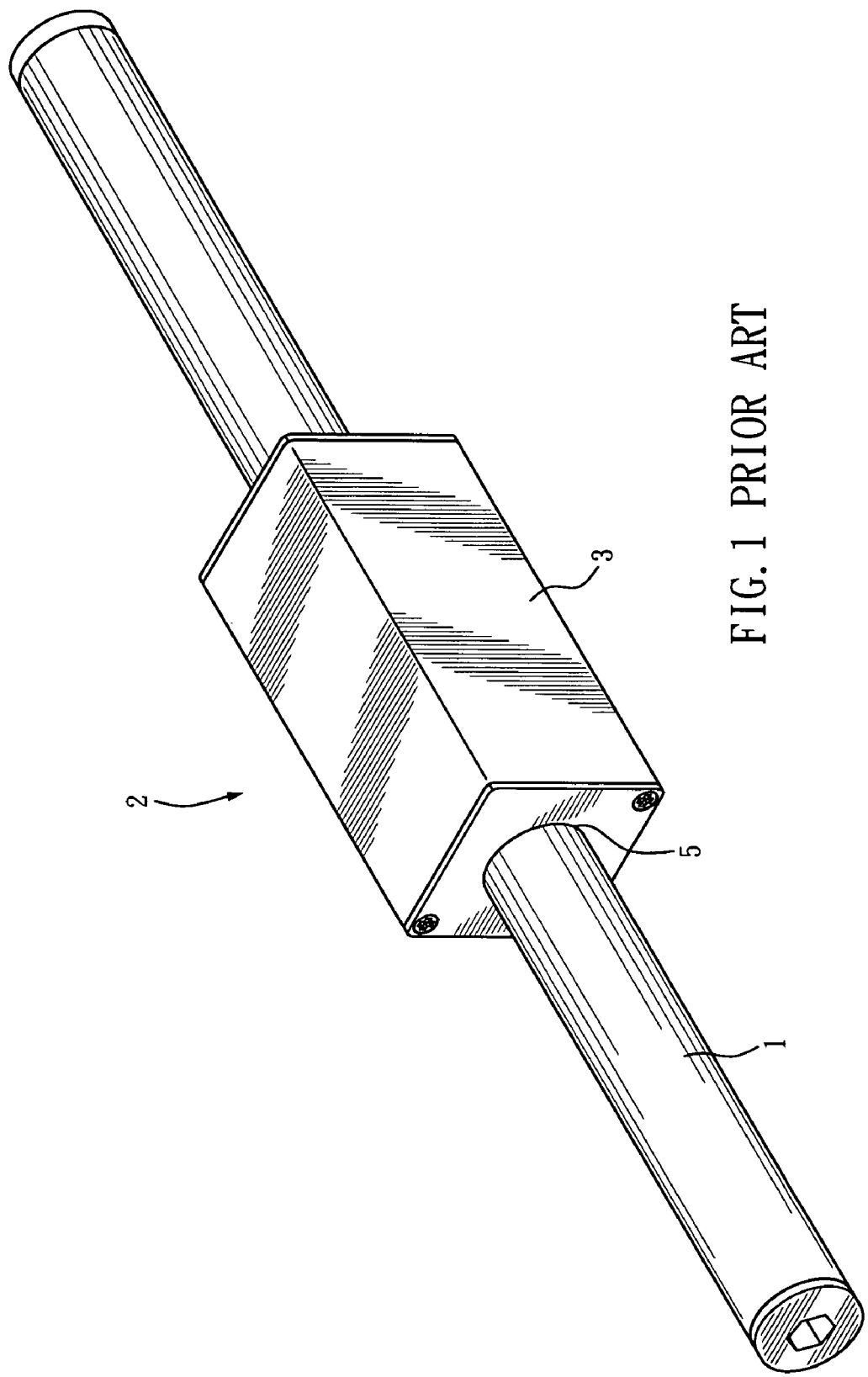
FIG. 1 is a perspective view of a conventional movable magnet type linear motor.
Figure 2:
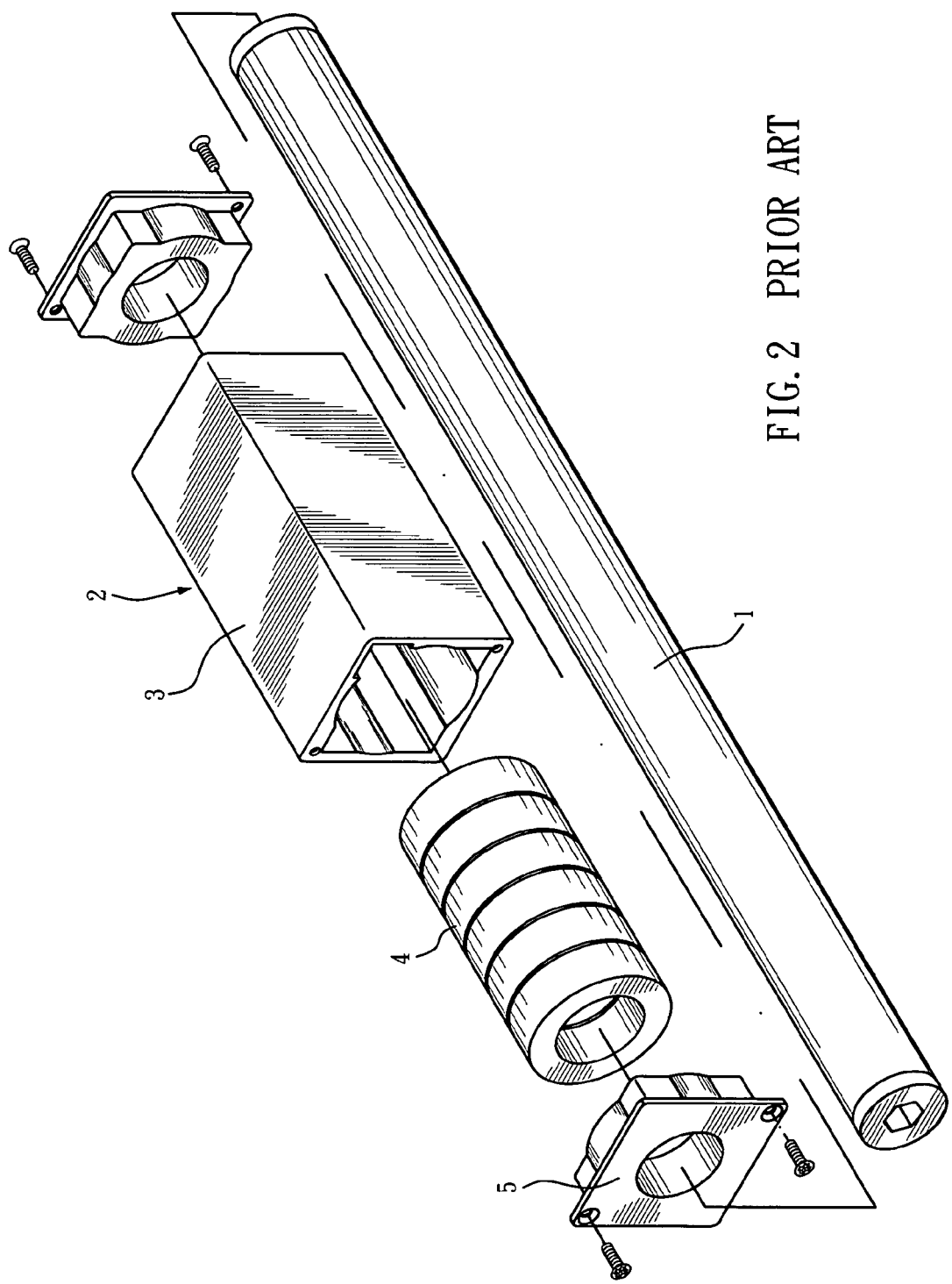
FIG. 2 is an exploded view of the conventional movable magnet type linear motor.
Figure 3:
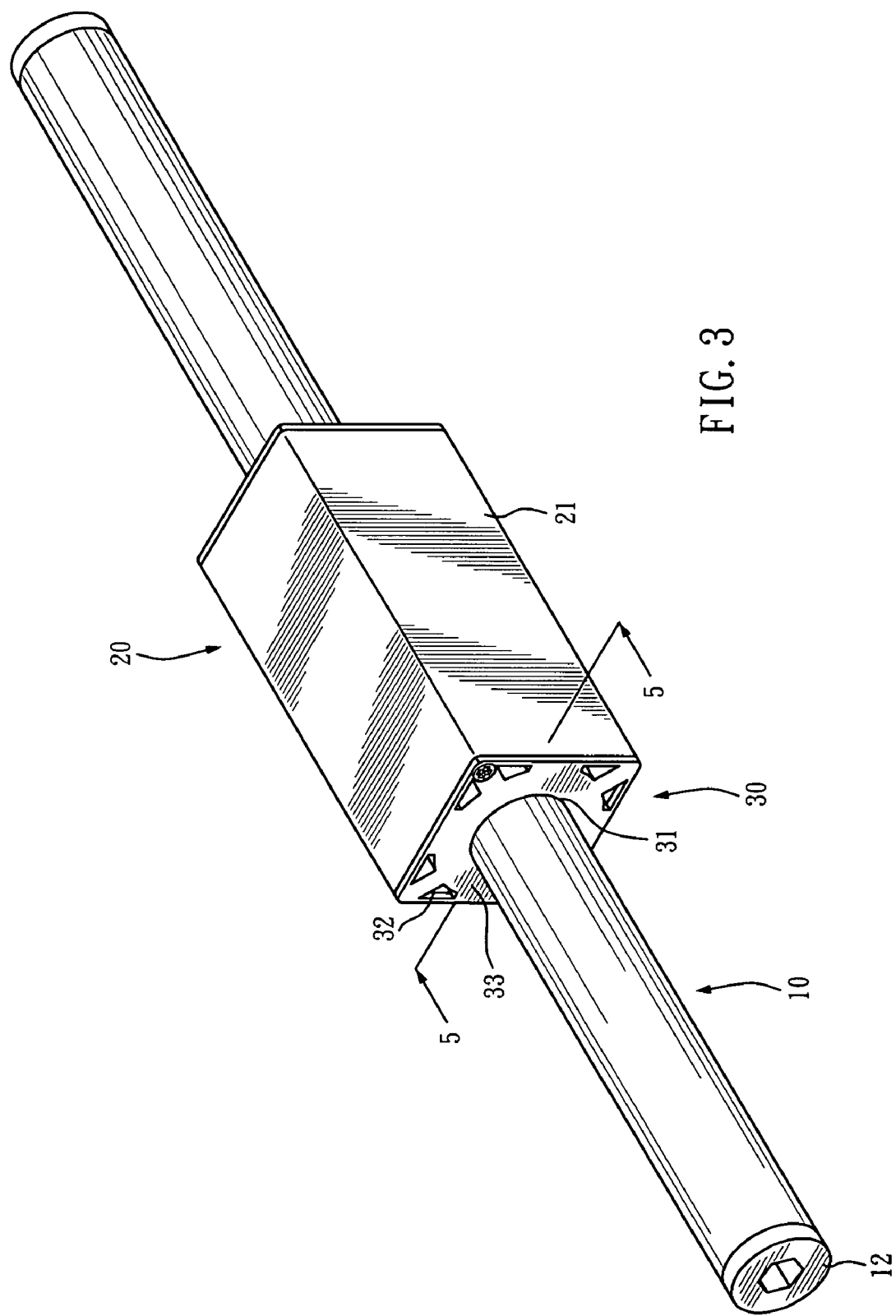
FIG. 3 is a perspective view of a mover according to the present invention.
Figure 4:
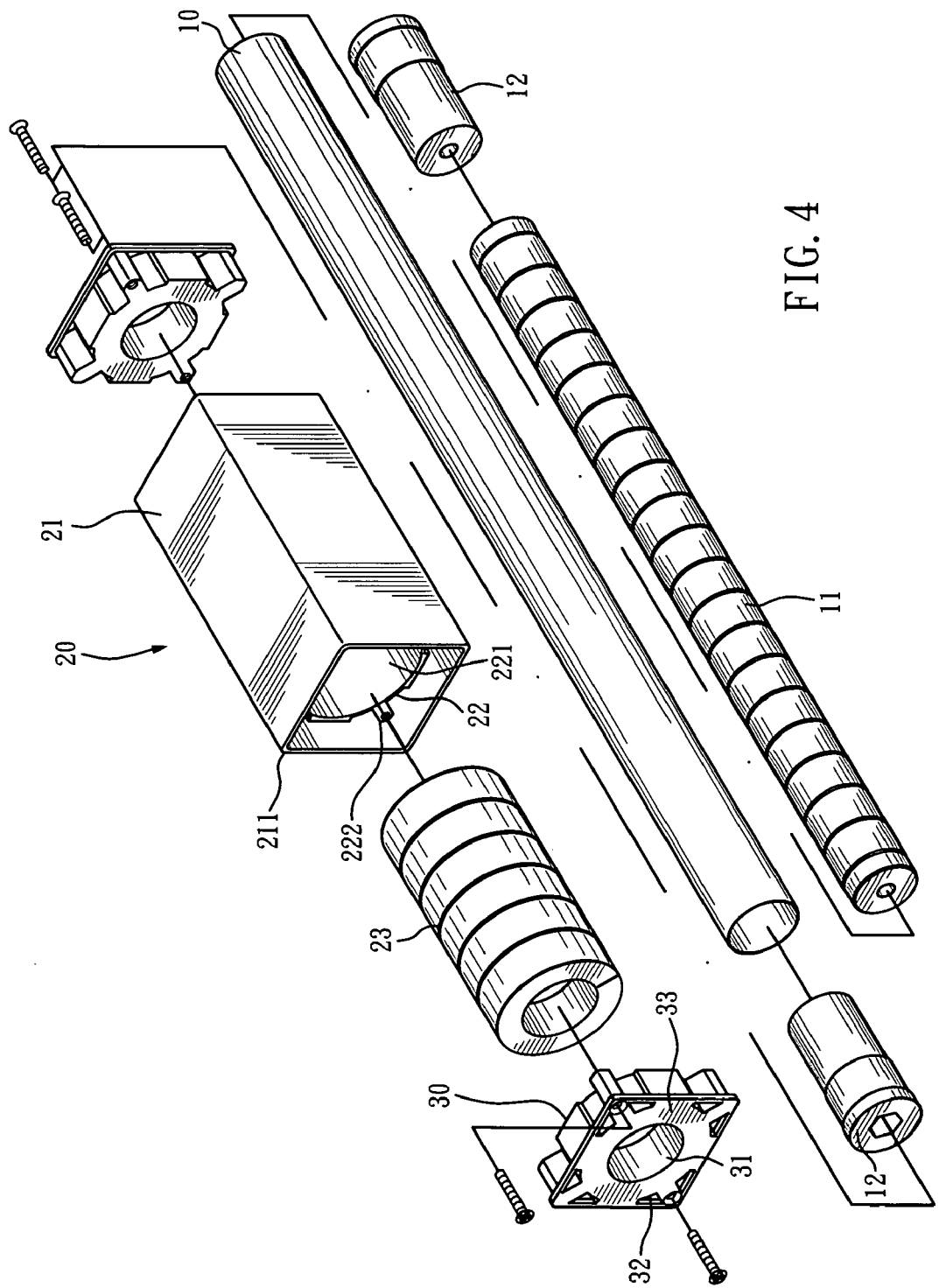
FIG. 4 is an exploded view of a movable magnet type linear motor according to the present invention.
Figure 5:
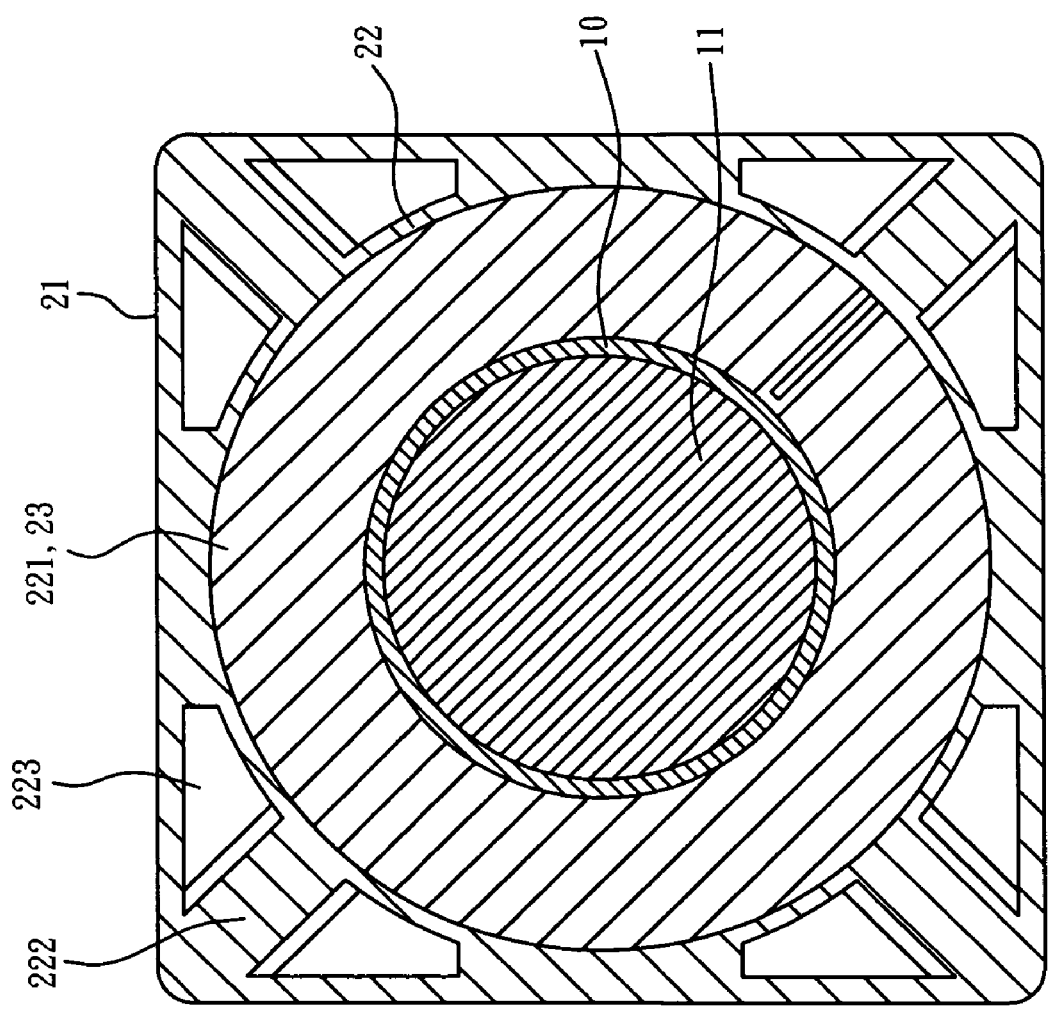
FIG. 5 is a section drawing taken along Line 5-5 of FIG. 3.

Please refer to FIGS. 3 through 5 for a movable magnet type linear motor, which includes a stationary inner stator 10, a mover 20, and two end covers 30, Therein, the stationary inner stator 10 includes a hollow tube filled with a plurality of permanent magnets 11. Two plugs 12 are attached to two opposite ends of the inner stator 10 so as to retain the permanent magnets 11 in the hollow tube.

The mover 20 is constructed form a hollow housing 21 that has two openings 211 formed at two opposite ends thereof. A coil seat 22 in the hollow housing 21 includes an accommodating space 221. A plurality of heat sink fins 222 are spaced and settled between the coil seat 22 and the housing 21. The heat sink fins 222 define therebetween plural heat dissipating channels 223 axially extending in the housing 21. Therein, a coil 23 is deposited in the accommodating space 221, which is shaped corresponding to the coil 23 so as to fittingly receive the coil 23.

The two end covers 30 are detachably assembled to the openings 211 at the two ends of the housing 21. Each of the end covers 30 is centrally formed with a hole 31 for allowing the stator 10 to pass therethrough, so that the mover 20 is slidably mounted around the stator 10. Therein, the end cover 30 is further formed with a plurality of heat dissipating holes 32 corresponding to the heat dissipating channels 223 so that when the end covers 30 are assembled to the openings 211, the dissipating channels 223 are intercommunicated with external environment through the heat dissipating holes 32. In addition, an annular retaining flange 33 is formed around the periphery of the hole 31 so that when assembled to the opening 211, the end cover 30 is retained at the open end of the accommodating space 221.

Referring to FIG. 5, since the accommodating space 221 is shaped corresponding to the coil 23, the coil 23 is fittingly inlaid in the coil seat 22. Thereby, when the coil 23 generates heat, the heat can be directly passed to the coil seat 22, and then the heat sink fins 222 can promptly transmit the heat to the housing 21 for heat dissipation.

Meantime, the heat dissipating channels 223 defined by the heat sink fins 222 are intercommunicated with external air through the heat dissipating holes 32. When the mover 20 axially shifts along the stator 10, the ambient cool air can enter the heat dissipating channels 223 through the heat dissipating holes 32 so as to further cool down the coil seat 22. The heat sink fins 222 substantively enlarge the heat dissipating area of the coil seat 22. Besides, the housing 21, the coil seat 22 and the heat sink fins 222 may be integratedly made of metal so as to maximize the heat dissipating efficiency and speed.

Figure 6:
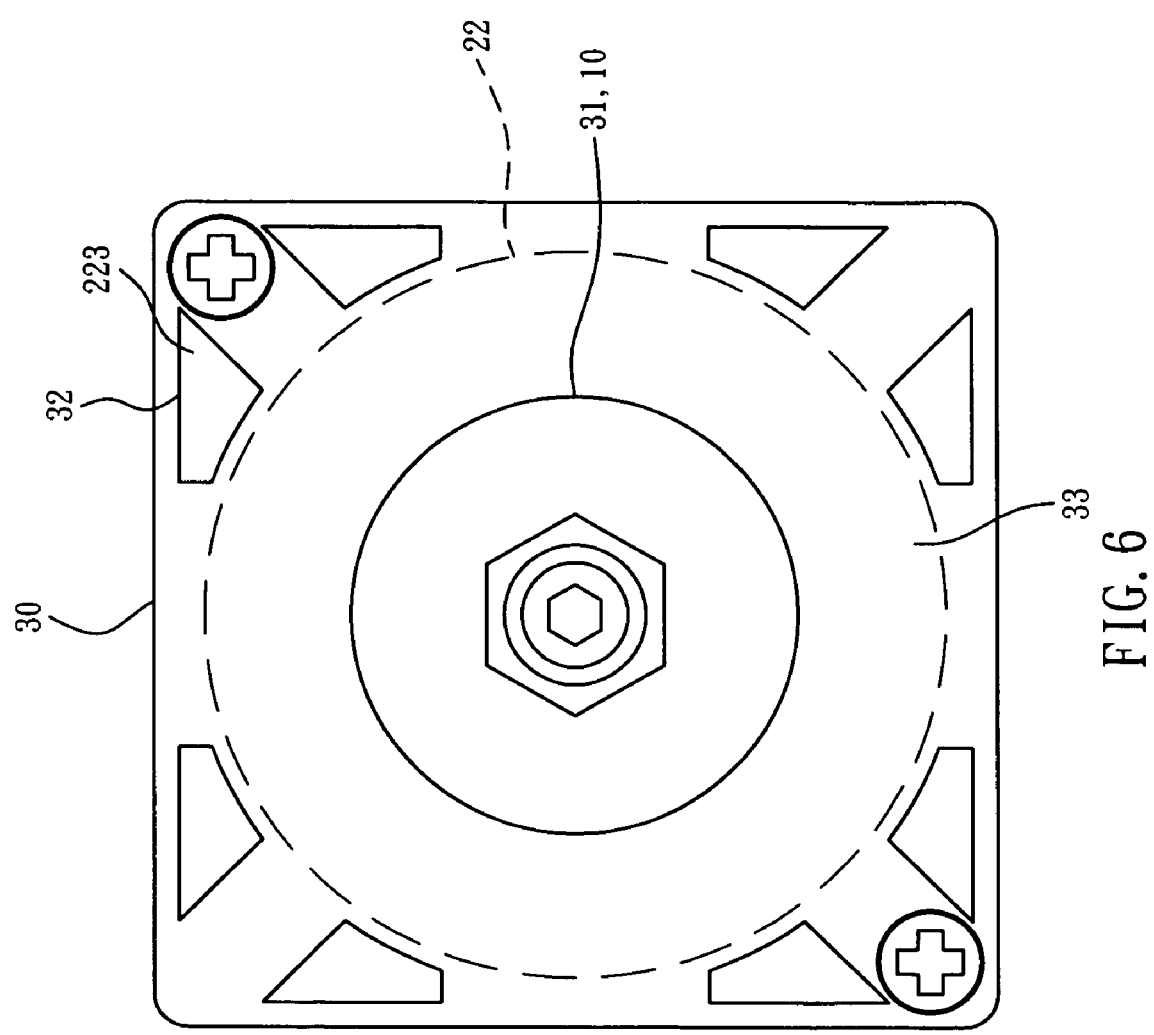
FIG. 6 is a side planar view of the movable magnet type linear motor according to the present invention.

Referring to FIG. 6, the annular retaining flange 33 formed around the periphery of the hole 31 serves to retain the end cover 30 at the open end of the accommodating space 221 when the end cover 30 is assembled to the opening 211. Therefore, the end covers 30, the accommodating space 221 and the stator 10 jointly form a well-sealed assembly. When settled therein, the coil 23 is effectively protected against dust, water and oil, thus allowing an improved service life and duration to the resultant movable magnet type linear motor.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A movable magnet type linear motor with a mover heat-dissipating assembly, the movable magnet type linear motor comprising:
   a) a mover having:
      i) a housing receiving therein a coil seat for holding a coil, wherein a plurality of heat dissipating channels are provided between the coil seat and the housing;
      ii) openings formed at two opposite ends of the housing and having a plurality of heat dissipating holes corresponding to the heat dissipating channels; and
      iii) end covers attached to the openings and having central holes; and
   b) an inner stator passing through the holes;
   wherein the coil seat has an accommodating space and the accommodating space is shaped corresponding to the coil so that the coil is fittingly inlaid in the accommodating space of the coil seat; and
   wherein a plurality of heat sink fins are spaced and settled between the coil seat and the housing and the heat sink fins define therebetween plural heat dissipating channels axially extending in the housing.

2. The movable magnet type linear motor of claim 1, wherein an annular retaining flange is formed around a periphery of the hole so that when assembled to the opening, the end cover is retained at the open end of the accommodating space.

* * * * *